United States Patent
Sutton et al.

(10) Patent No.: US 11,261,735 B2
(45) Date of Patent: Mar. 1, 2022

(54) REMOVABLE ROTOR BLADE TIP

(71) Applicant: Bell Helicopter Textron Inc., Fort Worth, TX (US)

(72) Inventors: Drew Sutton, Watauga, TX (US); Tim Ledbetter, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 1290 days.

(21) Appl. No.: 13/789,265

(22) Filed: Mar. 7, 2013

(65) Prior Publication Data

US 2014/0255201 A1  Sep. 11, 2014

(51) Int. Cl.
*F01D 5/14* (2006.01)
*B64C 27/46* (2006.01)

(52) U.S. Cl.
CPC ............ *F01D 5/147* (2013.01); *B64C 27/463* (2013.01); *Y10T 29/49337* (2015.01)

(58) Field of Classification Search
CPC ........ F03D 1/0675; F01D 5/147; F16B 12/10; F16B 12/2009; F16B 37/0821; B64C 27/463; B64C 27/473; Y10T 29/49337
USPC ........ 416/61, 62, 226, 228, 207, 232, 146 R
See application file for complete search history.

(56) References Cited

U.S. PATENT DOCUMENTS

| | | | |
|---|---|---|---|
| 1,382,849 A * | 6/1921 | Perl .................... | A47H 13/02 24/457 |
| 1,878,816 A * | 9/1932 | Bucklen ............... | B64C 11/04 416/207 |
| 2,118,361 A * | 5/1938 | Schaeffer, Jr. ....... | F16B 37/0821 411/433 |
| 2,257,327 A * | 9/1941 | Bradford ............. | F16B 37/0821 411/433 |
| 2,397,132 A | 3/1946 | Dent, Jr. | |
| 2,815,820 A | 12/1957 | Papadakos | |
| 5,263,821 A * | 11/1993 | Noehren ................ | B64C 27/33 415/115 |
| 5,320,494 A * | 6/1994 | Reinfelder ........... | B64C 27/463 156/701 |
| 5,885,059 A | 3/1999 | Kovalsky et al. | |
| 6,976,829 B2 | 12/2005 | Kovalsky et al. | |
| 7,246,998 B2 | 7/2007 | Kovalsky et al. | |

(Continued)

FOREIGN PATENT DOCUMENTS

DE  638559 C  11/1936
GB  485750 A  5/1938

OTHER PUBLICATIONS

Wu Yundong, 1988, Sage Publications, Wind Engineering vol. 12, No. 1 (1988), pp. 48-58, https://www.jstor.org/stable/43749328?seq=1#page_scan_tab_contents.*

(Continued)

*Primary Examiner* — Dominick L Plakkoottam
*Assistant Examiner* — Charles W Nichols
(74) *Attorney, Agent, or Firm* — Edwin S. Flores; Daniel J. Chalker; Chalker Flores, LLP (57) ABSTRACT

A rotor blade has a spanwise axis, a root comprising an anchor having an anchor surface configured to form at least one of a normal angle relative to the spanwise axis and an acute angle relative to the spanwise axis, and a selectively removable tip comprising a connector having a connector surface configured to complement the anchor surface.

20 Claims, 5 Drawing Sheets

(56) References Cited

U.S. PATENT DOCUMENTS

| | | | |
|---|---|---|---|
| 7,758,312 B2* | 7/2010 | Leahy | B64C 27/463 416/224 |
| 2006/0104812 A1 | 5/2006 | Kovalsky et al. | |
| 2008/0145231 A1* | 6/2008 | Llorente Gonzales | F03D 1/0675 416/243 |
| 2011/0031292 A1* | 2/2011 | Krogh | B60P 3/40 224/553 |
| 2011/0052403 A1* | 3/2011 | Kawasetsu | F03D 1/0675 416/226 |
| 2011/0158788 A1* | 6/2011 | Bech | F03D 1/0675 415/1 |
| 2011/0235193 A1* | 9/2011 | Yagi | G02B 7/04 359/819 |
| 2012/0141284 A1* | 6/2012 | Auberon | F03D 1/0675 416/226 |
| 2012/0321376 A1* | 12/2012 | Walters | B29C 66/543 403/267 |
| 2015/0292478 A1* | 10/2015 | Soloway | F03D 1/0675 416/145 |

OTHER PUBLICATIONS

Foreign Communication From a Counterpart Application, European Application No. 13165390.9, Extended European Search Report dated Nov. 12, 2013, 8 pages.
Communication pursuant to Article 94(3) issued in EP Application No. 13165390.9 dated Jun. 23, 2014, 4 pages.
Examination Report issued in Canadian Application No. 2,845,134 dated Apr. 16, 2015, 4 pages.

* cited by examiner

REMOVABLE ROTOR BLADE TIP

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotor blades, such as, but not limited to, rotor blades for helicopters, may comprise tips configured to manage tip noise and/or to increase performance. In some cases, a rotor blade tip may be damaged or otherwise may be undesirable for a selected application while a root of the same rotor blade may be acceptable for the selected application.

SUMMARY

In some embodiments of the disclosure, a rotor blade is disclosed as comprising a spanwise axis, a root comprising an anchor having an anchor surface configured to form at least one of a normal angle relative to the spanwise axis and an acute angle relative to the spanwise axis, and a selectively removable tip comprising a connector having a connector surface configured to complement the anchor surface.

In other embodiments of the disclosure, a method of assembling a rotor blade is disclosed as comprising providing a root along a spanwise axis and an anchor having an anchor surface configured to form at least one of a normal angle relative to the spanwise axis and an acute angle relative to the spanwise axis, providing a selectively removable tip comprising a connector having a connector surface configured to generally complement the anchor surface, and mating the connector surface to the anchor surface.

In yet other embodiments of the disclosure, a rotor system is disclosed as comprising an axis of rotation and a rotor blade comprising a spanwise axis and configured for selective rotation about the axis of rotation, the rotor blade further comprising a root comprising an anchor, and a selectively removable tip comprising a connector configured to complement the anchor, wherein the root is at least partially disposed along the spanwise axis between the tip and the axis of rotation, and wherein at least a portion of the connector is located along the spanwise axis between the axis of rotation and the anchor.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to replace a rotor blade tip, such as, but not limited to, a tip of a helicopter rotor blade. For example, in cases where a root of a rotor blade remains undamaged and/or is otherwise acceptably suited for a particular application, but a rotor blade tip connected to the root is damaged and/or is otherwise undesirable for the particular application, it may be desirable to replace the tip while retaining the root of the rotor blade. In some embodiments of the disclosure, systems and methods are disclosed that comprise providing a rotor blade with a selectively removable tip, wherein a substantial and/or primary centrifugal force generated by rotating the rotor blade about an axis of rotation is transferred between an anchor of a root of the rotor blade and a connector of the tip of the rotor blade. In some embodiments, the centrifugal force may be transferred substantially directly between the anchor and the connector without substantially passing through and/or otherwise relying on a transfer path that comprises bolts. In some embodiments, the transfer of the centrifugal force may be accomplished by locating at least a portion of the connector between the center of rotation and the anchor. In some embodiments, an integrity of a connection between the root and the tip may be increased with an increase in the centrifugal force and/or increased rate of rotation of the rotor blade about the axis of rotation.

Figure 1:
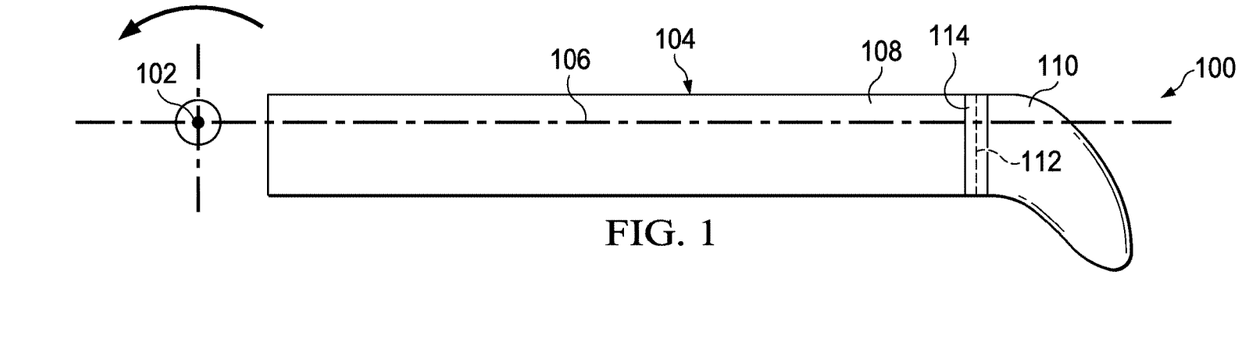
FIG. 1 is an orthogonal top view of a portion of a rotor system according to an embodiment of the disclosure.
Figure 2:
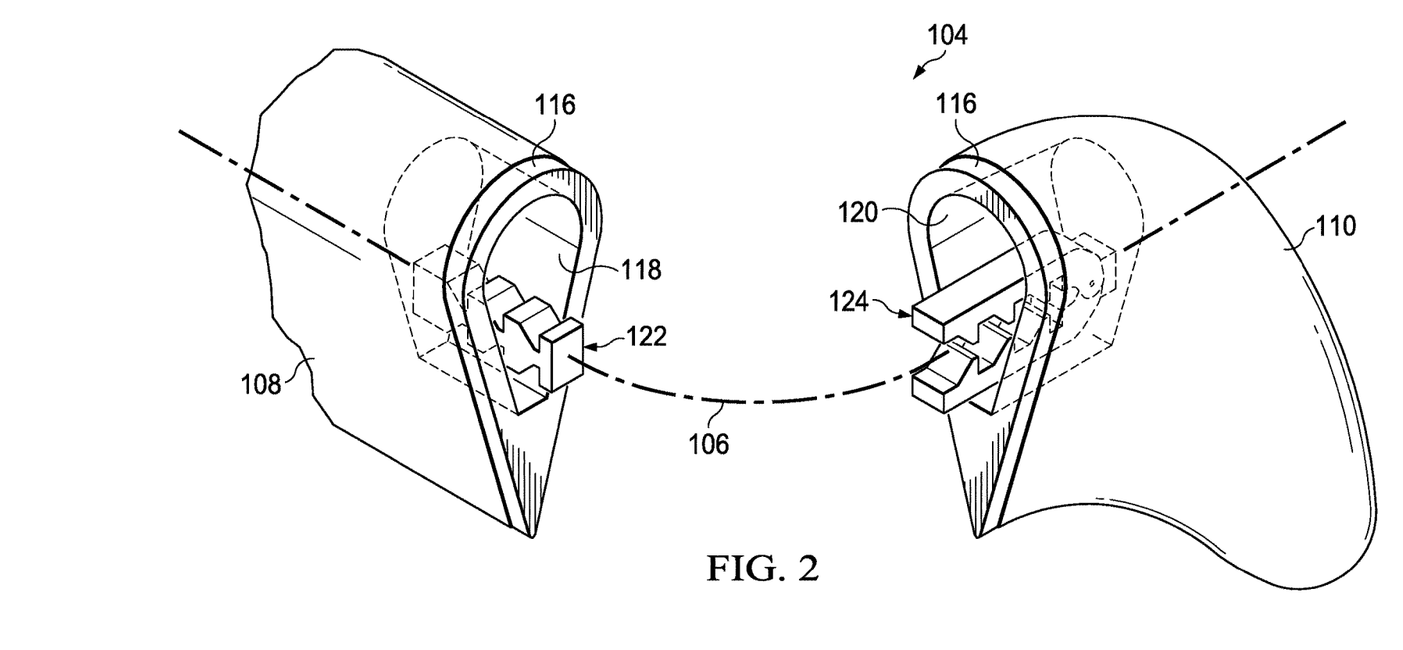
FIG. 2 is an oblique exploded view of a portion of the rotor system of FIG. 1.

Referring now to FIGS. 1-2, an orthogonal top view of a portion of a rotor system 100 in an assembled state and an oblique exploded view of a portion of the rotor system 100 are shown, respectively, according to an embodiment of the disclosure. The rotor system 100 generally comprises an axis of rotation 102 (see FIG. 1) that may be associated with a rotating mast and/or hub and one or more rotor blades 104. The rotor blade 104 generally comprises a spanwise axis 106 that may generally extend along a length of the rotor blade 104 and may generally be associated with a centrifugal force generated in response to the rotor blade 104 being rotated about the axis of rotation 102. The rotor blade 104 further comprises a root 108 and a selectively removable tip 110 connected at a distal end of the root 108. In some embodiments, a joint and/or mating interface 112 between the exteriors of the root 108 and tip 110 may be overlaid by a doubler patch 114 (see FIG. 1) that may comprise directional fiber composite material adhered to slightly recessed shelves 116 (see FIG. 2) of the root 108 and tip 110 so that the exterior surfaces of the root 108 and tip 110 may more closely behave at least one of structurally and aerodynamically as if the two were integrally formed. In other cases, a doubler patch 114 may simply overlay outer surfaces of the root 108 and tip 110 without filling a shelf 116. In some embodiments, the tip 110 may comprise an anhedral shape configured to reduce tip noise and/or to otherwise improve performance of the rotor blade 104.

Referring now to FIG. 2, the rotor blade 104 may further comprise a root cavity 118 and a tip cavity 120. The root cavity 118 may comprise a pocket or concavity formed in a distal end of the root 108. In some embodiments, at least a portion of an anchor 122 may be disposed in the root cavity 118. In some embodiments, the anchor 122 may comprise a substantially rigid component embedded, anchored, integrally formed with, adhered to, and/or otherwise substantially rigidly spatially retained relative to a remainder of the root 108 and/or relative to the boundaries of the root cavity 118. In some embodiments, the anchor 122 may be referred to as a spar.

Still referring to FIG. 2, the tip cavity 120 may comprise a pocket or concavity formed in a proximal end of the tip 110. In some embodiments, at least a portion of a connector 124 may be disposed in the tip cavity 120. In some embodiments, the connector 124 may comprise a substantially rigid component embedded, anchored, integrally formed with, adhered to, and/or otherwise at least partially substantially rigidly spatially retained relative to a remainder of the tip 110 and/or relative to the boundaries of the tip cavity 120. In some embodiments, the connector 124 may be referred to as a spar extension. Most generally, the rotor blade 104, root 108, tip 110, root cavity 118, tip cavity 120, anchor 122, and connector 124 may comprise a base set of generalized features and/or components upon which the additional details, features, and/or embodiments of FIGS. 3-8 may utilize and/or build upon.

Figure 3:
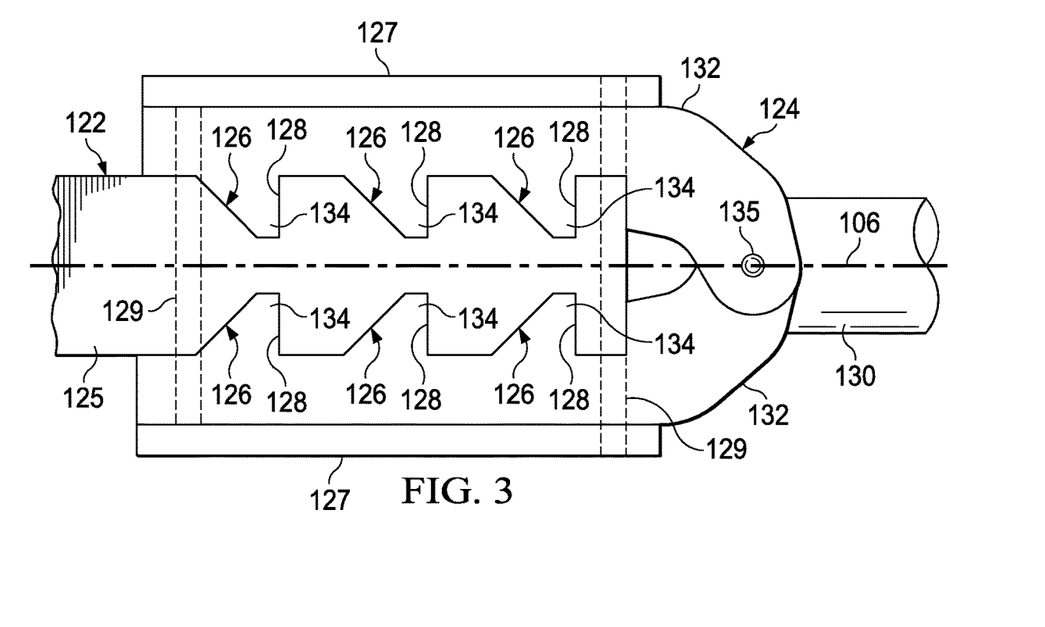
FIG. 3 is an orthogonal top view of an anchor and a connector according to an embodiment of the disclosure.

Referring now to FIG. 3, an orthogonal top view of an anchor 122 and a complementary connector 124 are shown in an assembled state according to an embodiment of the disclosure. The anchor 122 may generally comprise a cantilevered root rod 125 comprising teeth-shaped recesses 126. The recesses may comprise anchor surfaces 128 that lie generally normal to the spanwise axis 106. The connector 124 may generally comprise a cantilevered tip rod 130 to which one or more side jaws 132 are movably connected via a jaw pin 135. Side jaws 132 may comprise teeth 134 complementarily shaped to substantially fill the recesses 126 of root rod 125. When assembled together as shown in FIG. 3, any substantial centrifugal force tending to pull the tip 110 away from the root 108 may be transferred from the teeth 134 of the side jaws 132 to the anchor surfaces 128 of the recesses 126. Because the anchor surfaces 128 are generally normal to the spanwise axis 106, the side jaws 132 will not tend to open away from the root rod 125. In alternative embodiments, the anchor surfaces 128 may be acutely angled relative to the spanwise axis 106 which may cause the complementary teeth 134 to more securely engage the anchor surfaces 128 with an increase in centrifugal force. In some embodiments, the side jaws 132 may be biased toward each other about jaw pin 135 through the use of a spring and/or any other suitable mechanical biasing device. Additionally and/or alternatively, the side jaws 132 may be at least one of biased toward each other and/or spatially restrained relative to the root rod 125 by disposing a plug 127, spacer, shim, epoxy, and/or any other suitably stiff and/or expansive material between the side jaws 132 and adjacent interior walls of the root cavity 118 and/or tip cavity 120. In some embodiments, interior walls of the root cavity 118 and/or tip cavity 120 may be angled to selectively cause a closing action of the side jaws 132 toward the root rod 125 as the connector 124 is inserted into the root cavity 118. In some cases, the connector 124 may be inserted into the root cavity 118 through a distal end of the root cavity 118. However, in alternative embodiments, the connector 124 may be placed into position relative to the root rod 125 before a top or bottom wall of the root cavity 118 is fully formed so that the connector 124 slides into place relative to the root rod 125 like a puzzle piece from above or below. After such placement, a remainder of the root cavity 118 and/or tip cavity 120 may be completed to form the rotor blade 104. In some embodiments, a hoop stress component 129 may be applied generally at least partially circumferentially around at least a portion of each of the anchor 122 and the complementary connector 124 to maintain the connection between the anchor 122 and a complementary connector 124. In some embodiments, the hoop stress component 129 may be installed in a relatively low load direction and may assist in ensuring a centrifugal force capacity of the system and may reduce fretting and/or cyclical and/or fatigue working of the connection. In some cases, the hoop stress component 129 may be configured to additionally extend around the plug 127. In some embodiments, the hoop stress component 129 may comprise epoxy, an elastic and/or elastomeric material, a metallic strap, a shrink wrap component, and/or any other suitable strap or loop configured to retain the system components relative to each other.

Figure 4:
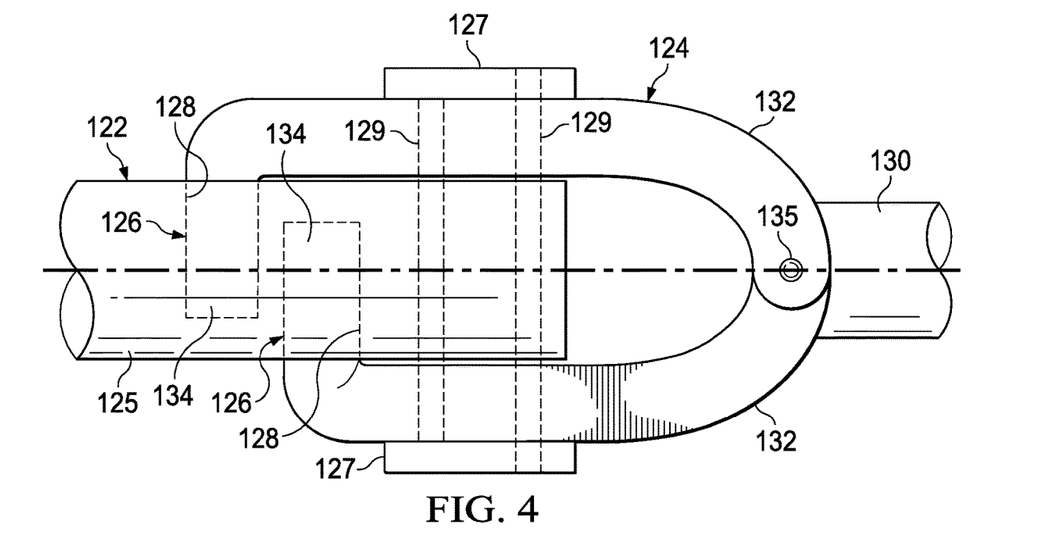
FIG. 4 is an orthogonal top view of an anchor and a connector according to another embodiment of the disclosure.

Referring now to FIG. 4, an orthogonal top view of an anchor 122 and a complementary connector 124 are shown in an assembled state according to another embodiment of the disclosure. The anchor 122 may generally comprise a cantilevered root rod 125 comprising box-shaped recesses 126. The recesses may comprise anchor surfaces 128 that lie generally normal to the spanwise axis 106. The connector 124 may generally comprise a cantilevered tip rod 130 to which one or more side jaws 132 are movably connected via a jaw pin 135. Side jaws 132 may comprise teeth 134 complementarily shaped to substantially fill the recesses 126 of root rod 125. When assembled together as shown in FIG. 3, any substantial centrifugal force tending to pull the tip 110 away from the root 108 may be transferred from the teeth 134 of the side jaws 132 to the anchor surfaces 128 of the recesses 126. Because the anchor surfaces 128 are generally normal to the spanwise axis 106, the side jaws 132 will not tend to open away from the root rod 125. In alternative embodiments, the anchor surfaces 128 may be acutely angled relative to the spanwise axis 106 which may cause the complementary teeth 134 to more securely engage the anchor surfaces 128 with an increase in centrifugal force. In some embodiments, the side jaws 132 may be biased toward each other about jaw pin 135 through the use of a spring and/or any other suitable mechanical biasing device. Additionally and/or alternatively, the side jaws 132 may be at least one of biased toward each other and/or spatially restrained relative to the root rod 125 by disposing a plug 127, spacer, shim, epoxy, and/or any other suitably stiff and/or expansive material between the side jaws 132 and adjacent interior walls of the root cavity 118 and/or tip cavity 120. In some embodiments, interior walls of the root cavity 118 and/or tip cavity 120 may be angled to selectively cause a closing action of the side jaws 132 toward the root rod 125 as the connector 124 is inserted into the root cavity 118. In some cases, the connector 124 may be inserted into the root cavity 118 through a distal end of the root cavity 118. However, in alternative embodiments, the connector 124 may be placed into position relative to the root rod 125 before a top or bottom wall of the root cavity 118 is fully formed so that the connector 124 slides into place relative to the root rod 125 like a puzzle piece from above or below. After such placement, a remainder of the root cavity 118 and/or tip cavity 120 may be completed to form the rotor blade 104. In some embodiments, the recesses 126 and associated teeth 134 may overlap each other spanwise and/or chordwise (transverse to spanwise) as viewed from above and/or spanwise and/or chordwise as viewed from a side so that recesses 126 and teeth 134 may be disposed at various locations on root rod 125 while preserving a needed cross-sectional area of material for transmitting centrifugal forces.

Figure 5:
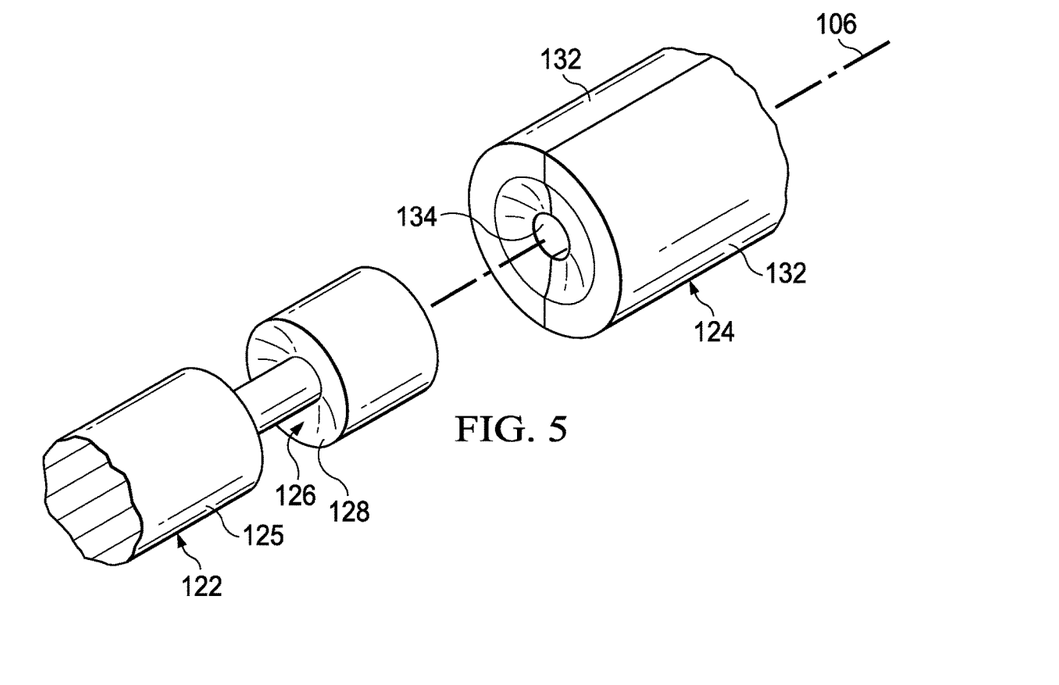
FIG. 5 is an orthogonal top view of an anchor and a connector according to another embodiment of the disclosure.

Referring now to FIG. 5, an oblique top-side-proximal view of an anchor 122 and a complementary connector 124 are shown in a disassembled state according to an embodiment of the disclosure. The anchor 122 may generally comprise a cantilevered root rod 125 comprising a generally annular recess 126. The recess 126 may comprise a concave anchor surface 128 that generally faces open toward the axis of rotation 102. The connector 124 may generally comprise a cantilevered tip rod to which one or more side jaws 132 are movably connected via a jaw pin. Side jaws 132 may comprise teeth 134 complementarily shaped to substantially fill the recess 126 of root rod 125, including the concavity formed by the anchor surface 128. When assembled, any substantial centrifugal force tending to pull the tip 110 away from the root 108 may be transferred from the teeth 134 of the side jaws 132 to the anchor surface 128 of the recess 126. Because the anchor surface 128 is concave and the teeth 134 are convex, at least on a distal side, the side jaws 132 will not tend to open away from the root rod 125. In alternative embodiments, the anchor surfaces 128 may be acutely angled relative to the spanwise axis 106 which may cause the complementary teeth 134 to more securely engage the anchor surfaces 128 with an increase in centrifugal force. In some embodiments, the side jaws 132 may be biased toward each other about a jaw pin through the use of a spring and/or any other suitable mechanical biasing device. Additionally and/or alternatively, the side jaws 132 may be at least one of biased toward each other and/or spatially restrained relative to the root rod 125 by disposing a plug 127, spacer, shim, epoxy, and/or any other suitably stiff and/or expansive material between the side jaws 132 and adjacent interior walls of the root cavity 118 and/or tip cavity 120. In some embodiments, interior walls of the root cavity 118 and/or tip cavity 120 may be angled to selectively cause a closing action of the side jaws 132 toward the root rod 125 as the connector 124 is inserted into the root cavity 118. In some cases, the connector 124 may be inserted into the root cavity 118 through a distal end of the root cavity 118. However, in alternative embodiments, the connector 124 may be placed into position relative to the root rod 125 before a wall of the root cavity 118 is fully formed. After such placement, a remainder of the root cavity 118 and/or tip cavity 120 may be completed to form the rotor blade 104.

Figure 6:
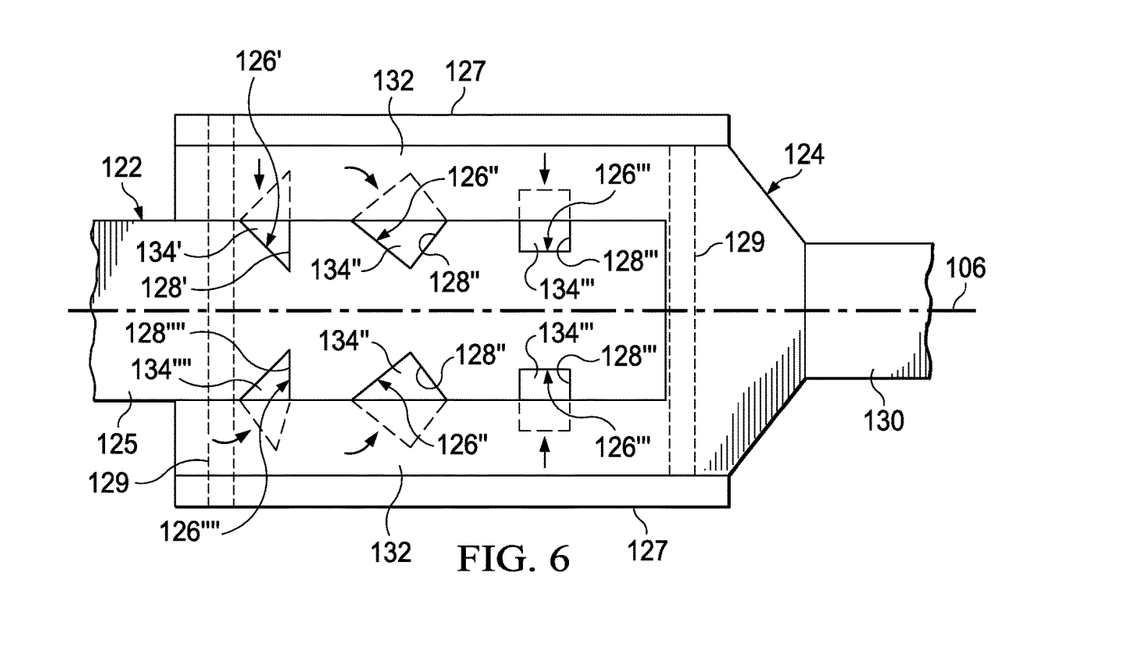
FIG. 6 is an orthogonal top view of an anchor and a connector according to another embodiment of the disclosure.

Referring now to FIG. 6, an orthogonal top view of an anchor 122 and a complementary connector 124 are shown in an assembled state according to another embodiment of the disclosure. The anchor 122 is substantially similar to the anchor 122 of FIG. 3 but for the shape of the recesses 126. The connector 124 is substantially similar to the connector 124 of FIG. 3 but for the side jaws 132 not being substantially hinged. Instead, the teeth 134 are individually biased toward the recesses 126 of the anchor 122. Recesses 126' may generally comprise right triangle shapes so that anchor surfaces 128' are generally normal to spanwise axis 106. Teeth 134' may generally complement recesses 126' and be biased primarily in chordwise directions toward the associated recess 126'. Tooth 134'" is substantially similar to tooth 134' except that tooth 134'" is rotationally biased rather than biased chordwise. Recesses 126" may generally comprise triangle shapes so that anchor surfaces 128" generally form acute angles relative to spanwise axis 106. Tooth 134" may generally complement recess 126" and be rotationally biased at a generally proximal side to bias the tooth 134" toward the recess 126". Recesses 126'" may generally be box shaped so that anchor surfaces 128'" are generally normal to spanwise axis 106. Teeth 134'" may generally complement recess 126'" and be biased primarily in chordwise directions toward the associated recesses 126'". In this embodiment, each anchor surface 128 is angled so that increases in centrifugal forces either do not degrade a connection between the root 108 and tip 110 or increase an integrity of the connection.

Figure 7:
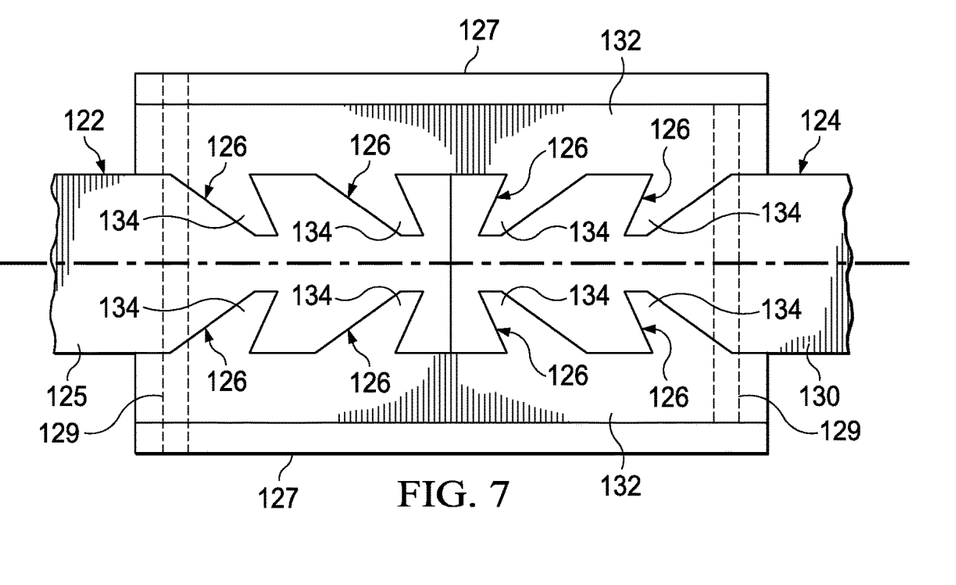
FIG. 7 is an orthogonal top view of an anchor and a connector according to another embodiment of the disclosure.

Referring now to FIG. 7, an orthogonal top view of an anchor 122 and a complementary connector 124 are shown in an assembled state according to another embodiment of the disclosure. The anchor 122 comprises a root rod 125 and the connector 124 comprises a tip rod 130. However, in this embodiment, each of the root rod 125 and the tip rod 130 comprise recesses 126. In this embodiment, side jaws 132 extend spanwise across the mating interface 112 and comprise teeth 134 on opposing spanwise sides of the side jaws 132 relative to the mating interface 112. In some embodiments, side jaws 132 may be connected so at their top or bottom sides to generally form a C or U-shaped structure comprising the teeth 134. When assembled, any substantial centrifugal force tending to pull the tip 110 away from the root 108 may be transferred from the recesses 126 associated with the tip rod 130 to the teeth 134 associated with the tip rod 130, from the teeth 134 associated with the tip rod 130 to the teeth associated with the root rod 125, and from the teeth 134 associated with the root rod 125 to the recesses 126 associated with the root rod 125. Because the anchor surfaces 128 are acutely angled relative to the spanwise axis 106 and the source of tension the side jaws 132 will not tend to move away from the root rod 125 and/or the tip rod 130. In some embodiments, the side jaws 132 may be biased toward each other about a jaw pin through the use of a spring and/or any other suitable mechanical biasing device. Additionally and/or alternatively, the side jaws 132 may be at least one of biased toward each other and/or spatially restrained relative to the root rod 125 by disposing a plug 127, spacer, shim, epoxy, and/or any other suitably stiff and/or expansive material between the side jaws 132 and adjacent interior walls of the root cavity 118 and/or tip cavity 120. The side jaws 132 may be placed into position before a wall of the root cavity 118 and/or tip cavity 120 are fully formed. After such placement, a remainder of the root cavity 118 and/or tip cavity 120 may be completed to form the rotor blade 104.

Figure 8:
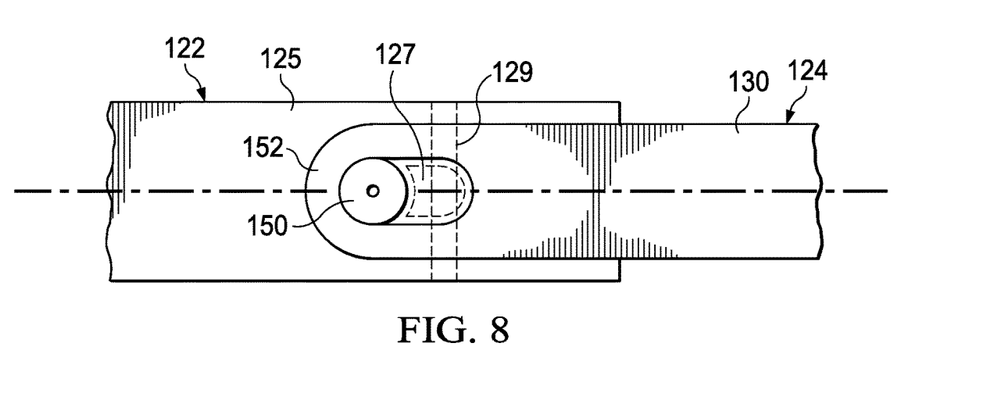
FIG. 8 is an orthogonal top view of an anchor and a connector according to another embodiment of the disclosure.

Referring now to FIG. 8, an orthogonal top view of an anchor 122 and a complementary connector 124 are shown in an assembled state according to another embodiment of the disclosure. The anchor 122 comprises an eccentric stud 150 and the connector 124 comprises a tension-torsion strap 152. In this embodiment, the tension-torsion strap 152 may be placed around the eccentric stud 150 to provide a force path for centrifugal forces. In some cases, the tension-torsion strap 152 may not immediately be tightly mated against the eccentric stud 150. Accordingly, in some embodiments, the eccentric stud 150 may be rotated to tighten the eccentric stud 150 against the tension-torsion strap 152. With the eccentric stud 150 in place against the tension-torsion strap 152, the two may be spatially restrained relative to each other by disposing a plug 127, spacer, shim, epoxy, and/or any other suitably stiff and/or expansive material between interior of the tension-torsion strap 152 and the exterior of the eccentric stud 150. Further, additional plugs, spacers, shims, epoxy, and/or any other suitably stiff and/or expansive materials may be placed between the interior walls of the root cavity 118 and/or tip cavity 120 and the remainder of the tension-torsion strap 152 and/or eccentric stud 150.

Figure 9:
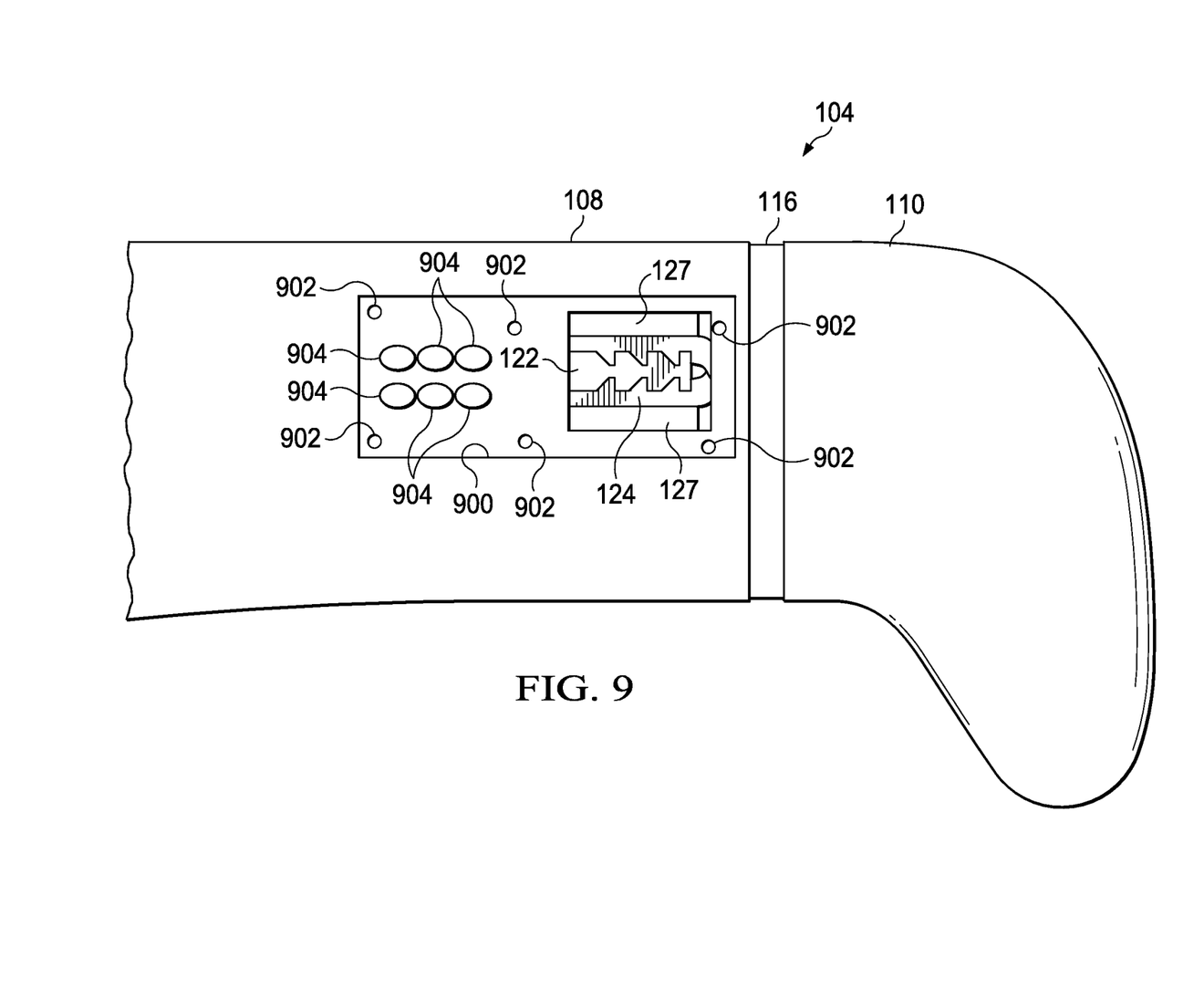
FIG. 9 is an orthogonal top view of a portion of a rotor system according to another embodiment of the disclosure.

Referring now to FIG. 9, an orthogonal top view of a portion of a rotor system comprising a rotor blade 104 is shown according to another embodiment of the disclosure. In this embodiment, the rotor blade 104 comprises an access hole 900 formed in the root 108 that allows convenient access to at least one of the anchor 122 and the connector 124. In some embodiments, a cover may be attached to the root 108 to cover the access hole 900 through the use of fasteners and/or fastener receivers 902. In some embodiments, blade balancing weights 904 may also be accessible through the access hole 900.

In some embodiments, a tip may be removably connected to a root without utilizing one or more of a bolt, bonding a primary load path structure, a threaded connection between the tip and the root, and/or disposing elastomeric material between substantially rigid connection interfaces between the tip and the root. In some embodiments, an anchor and a complementary connector may comprise undulating profiles and one or both of the anchor and the complementary connector may comprise elastic properties that allow insertion of the complementary connector into the anchor and may depend primarily on an interference fit and/or contact surface area dependent function for retaining the tip to the root during rotation of the rotor blade.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A rotor blade comprising:
   a spanwise axis and a distal rotor blade end away from an axis of rotation of the rotor blade;
   a root at the distal rotor blade end, the root comprising a root cavity and an anchor at least partially disposed in the root cavity, the anchor having an anchor surface configured to form one or more concave recesses, each concave recess having recess anchor surfaces, each recess anchor surface of the one or more concave recesses at an acute angle toward the axis of rotation and relative to the spanwise axis; and
   a selectively removable tip comprising a tip cavity and a connector having a cantilevered tip rod and a pair of opposing jaws moveably connected to the cantilevered tip rod with a jaw pin, wherein the pair of opposing jaws is complementarily shaped to substantially fill the one or more concave recesses of the anchor surface, and an epoxy or an expansive material disposed between the pair of opposing jaws and an adjacent interior wall of the tip cavity;
   wherein the anchor and the connector are configured to dispose, when the anchor surface and the pair of opposing jaws are mated, at least a portion of each of the anchor and the pair of opposing jaws within the rotor root cavity.

2. The rotor blade of claim 1, wherein the anchor comprises a cantilevered root rod.

3. The rotor blade of claim 1, wherein the one or more recesses comprise a generally triangular shape.

4. The rotor blade of claim 1, wherein the pair of opposing jaws comprise one or more teeth biased toward the one or more recesses of the anchor.

5. The rotor blade of claim 1, wherein the connector comprises at least one of a torsion-tension strap and a convex tooth.

6. The rotor blade of claim 1, wherein the pair of opposing jaws are at least partially disposed in a tip cavity of the removable tip, and the anchor and the pair of opposing jaws are configured so that mating the anchor surface and the pair of opposing jaws disposes at least a second portion of each of the anchor and the pair of opposing jaws within the tip cavity of the removable tip.

7. The rotor blade of claim 1, wherein the selectively removable tip comprises an anhedral shape.

8. The rotor blade of claim 1, further comprising a plug, spacer, shim, or stiff material disposed between the pair of opposing jaws and an adjacent interior wall of the root cavity or a tip cavity or both.

9. The rotor blade of claim 1, further comprising a hoop stress component disposed at least partially circumferentially around at least a portion of each of the anchor and the complementary connector.

10. The rotor blade of claim 1, wherein the interior walls of the root cavity are angled to cause the pair of opposing jaws to close around the anchor.

11. The rotor blade of claim 1, further comprising:
an access hole formed in the root and configured to provide access to the anchor or the connector or both; and
a cover removably attached to the root via a set of fasteners and disposed over the access hole.

12. A method of assembling a rotor blade, comprising:
providing the rotor blade comprising:
a spanwise axis and a distal rotor blade end away from an axis of rotation of the rotor blade;
a root along the spanwise axis and at the distal rotor blade end, the root comprising a root cavity an anchor at least partially disposed in the root cavity, the anchor having an anchor surface configured to form one or more concave recesses, each concave recess having recess anchor surfaces, each recess anchor surface of the one or more concave recesses at an acute angle toward the axis of rotation and relative to the spanwise axis; and
a selectively removable tip comprising a tip cavity and a connector having a cantilevered tip rod and a pair of opposing jaws moveably connected to the cantilevered tip rod with a jaw pin, wherein the pair of opposing jaws is complementarily shaped to substantially fill the one or more concave recesses of the anchor surface, and an epoxy or an expansive material disposed between the pair of opposing jaws and an adjacent interior wall of the tip cavity; and
mating the pair of opposing jaws to the one or more concave recesses of the anchor surface wherein mating the pair of opposing jaws to the one or more recesses of the anchor surface comprises disposing at least a portion of each of the anchor and the pair of opposing jaws within the root cavity of the root, wherein the mating occurs without one or more bolts.

13. The method of claim 12, wherein at least a portion of the pair of opposing jaws is inserted into the root cavity prior to the mating.

14. The method of claim 12, wherein the mating of at least a portion of each of the anchor and the pair of opposing jaws are outside the root cavity.

15. The method of claim 12, further comprising: at least one of biasing the pair of opposing jaws to the anchor surface and restricting movement of the anchor surface away from the pair of opposing jaws.

16. The method of claim 12, wherein a force with which the mating between the pair of opposing jaws mates to the anchor surface increases with an increase in centrifugal force resulting from rotation of the rotor blade about an axis of rotation.

17. A rotor system, comprising:
a rotating mast or hub having an axis of rotation; and
one or more rotor blades connected to the rotating mast or hub, each rotor blade comprising a spanwise axis and a distal rotor blade end away from an axis of rotation, each rotor blade configured for selective rotation about the axis of rotation, and each rotor blade comprising:
a root at the distal rotor blade end, the root comprising a root cavity and an anchor, the anchor having an anchor surface configured to form one or more concave recesses, each concave recess having recess anchor surfaces, each recess anchor surface of the one or more concave recesses at an acute angle toward the axis of rotation and relative to the spanwise axis; and
a selectively removable tip comprising a tip cavity and a connector at least partially disposed in the tip cavity, the connector having a cantilevered tip rod and a pair of opposing jaws moveably connected to the cantilevered tip rod with a jaw pin, wherein the pair of opposing jaws is complementarily shaped to substantially fill one or more concave recesses of the anchor, wherein the root is at least partially disposed along the spanwise axis between the removable tip and the axis of rotation, and an epoxy or an expansive material disposed between the pair of opposing jaws and an adjacent interior wall of the tip cavity;
wherein at least a portion of the pair of opposing jaws is located along the spanwise axis between the axis of rotation and the anchor; and
wherein the anchor and the connector are configured to dispose, when the anchor surface and the pair of opposing jaws are mated, at least a portion of each of the anchor and the pair of opposing jaws within the tip cavity of the removable tip without the use of one or more bolts.

18. The rotor system of claim 17, wherein the root comprises a root cavity configured to receive at least a portion of each of the anchor and the pair of opposing jaws when the pair of opposing jaws is assembled to the anchor.

19. The rotor system of claim 17, wherein the pair of opposing jaws comprise one or more teeth biased toward the one or more recesses of the anchor.

20. The rotor system of claim 17, wherein the pair of opposing jaws is configured to slide into engagement with the anchor.

* * * * *